US008967315B1

(12) United States Patent
Lescallett

(10) Patent No.: US 8,967,315 B1
(45) Date of Patent: Mar. 3, 2015

(54) POLICE MOTORCYCLE KIT

(76) Inventor: George Lescallett, Mesa, AZ (US)

( * ) Notice: Subject to any disclaimer, the term of this patent is extended or adjusted under 35 U.S.C. 154(b) by 207 days.

(21) Appl. No.: 13/049,757

(22) Filed: Mar. 16, 2011

Related U.S. Application Data

(60) Provisional application No. 61/314,496, filed on Mar. 16, 2010.

(51) Int. Cl.
B62K 11/02 (2006.01)
B62D 21/15 (2006.01)
B62J 27/00 (2006.01)
B60R 21/13 (2006.01)

(52) U.S. Cl.
CPC .............. B62K 11/02 (2013.01); B62D 21/157 (2013.01); B62J 27/00 (2013.01); B60R 21/131 (2013.01)
USPC ..... 180/219; 180/311; 280/304.3; 280/304.4; 280/756

(58) Field of Classification Search
USPC ........... 180/219, 311; 296/203.01; 280/304.3, 280/304.4, 756, 784
See application file for complete search history.

(56) References Cited

U.S. PATENT DOCUMENTS

| 2,109,315 | A | * | 2/1938 | Harley | 224/413 |
| 2,121,152 | A | * | 6/1938 | Knutson | 446/440 |
| 2,171,042 | A | * | 8/1939 | Minton | 180/219 |
| 2,194,660 | A | * | 3/1940 | Huff | 293/105 |
| 2,969,992 | A | * | 1/1961 | Hahn | 280/277 |
| 3,659,878 | A | * | 5/1972 | Carter | 280/7.15 |
| 3,934,900 | A | * | 1/1976 | Wilson | 280/152.3 |
| 3,939,730 | A | * | 2/1976 | DeHaan | 474/147 |
| 3,963,158 | A | * | 6/1976 | Clenet | 224/418 |
| 4,111,448 | A | * | 9/1978 | Sklodowsky | 280/304.4 |
| 4,163,513 | A | * | 8/1979 | Kramer | 224/413 |
| 4,311,335 | A | * | 1/1982 | Winiecki | 296/78.1 |
| 4,377,295 | A | * | 3/1983 | Lemman | 280/303 |
| 4,460,115 | A | * | 7/1984 | Jackson | 224/430 |
| 4,486,075 | A | * | 12/1984 | Cohen | 359/840 |
| 4,505,411 | A | * | 3/1985 | Munn | 224/461 |
| 4,515,300 | A | * | 5/1985 | Cohen | 224/153 |
| 4,618,019 | A | * | 10/1986 | Ando et al. | 180/219 |
| 4,620,713 | A | * | 11/1986 | Sakaguchi | 280/152.3 |
| D293,312 | S | * | 12/1987 | Stahel | D12/186 |
| 4,813,706 | A | * | 3/1989 | Kincheloe | 280/756 |
| RE33,178 | E | * | 3/1990 | Ahlberg | 280/801.2 |
| 5,354,084 | A | * | 10/1994 | Lofgren et al. | 280/250 |
| 5,358,267 | A | * | 10/1994 | Wakefield | 280/304.3 |
| 5,497,919 | A | * | 3/1996 | Klinger | 224/416 |
| 5,568,726 | A | * | 10/1996 | Yamada et al. | 60/323 |

(Continued)

FOREIGN PATENT DOCUMENTS

GB 4608 * 0/1905

Primary Examiner — Joseph Rocca
Assistant Examiner — Maurice Williams
(74) Attorney, Agent, or Firm — Schmeiser, Olsen & Watts LLP

(57) ABSTRACT

A kit for converting a motorcycle into a police motorcycle includes right and left-side drop bars, a rear drop bar, and a front impact guard. The kit further includes right and left-side saddlebags that open in a clamshell position or in a side-opening position. A controller compartment positioned above and between the saddlebags contains a controller for operation of the various electrical components of the police motorcycle, including visual and audio effects. The kit also includes flashers integrated into the front headlight and front handlebar risers that raise the handlebars sufficiently to allow a rider to sit upright, instead of prone, for better observation of the surroundings.

21 Claims, 8 Drawing Sheets

(56) References Cited

U.S. PATENT DOCUMENTS

| | | | |
|---|---|---|---|
| 5,743,561 A * | 4/1998 | Kim | 280/756 |
| 6,142,253 A * | 11/2000 | Mueller et al. | 180/219 |
| 6,176,503 B1 * | 1/2001 | George | 280/274 |
| 6,234,266 B1 * | 5/2001 | Saiki | 180/219 |
| 6,347,804 B1 * | 2/2002 | Seibel | 280/288.4 |
| 6,419,039 B1 * | 7/2002 | Wagner | 180/219 |
| 6,502,884 B2 * | 1/2003 | Shimazaki et al. | 296/37.1 |
| 6,634,664 B1 * | 10/2003 | Kojima | 280/288.4 |
| 6,702,058 B2 * | 3/2004 | Ishii et al. | 180/311 |
| 6,758,484 B1 * | 7/2004 | Rice | 280/304.4 |
| 6,802,440 B1 * | 10/2004 | Stowell | 224/413 |
| 6,837,509 B2 * | 1/2005 | Welch et al. | 280/304.3 |
| 6,845,895 B2 * | 1/2005 | Jones et al. | 224/585 |
| 6,910,704 B1 * | 6/2005 | Celiceo et al. | 280/304.4 |
| 6,913,304 B1 * | 7/2005 | Sweet | 296/37.6 |
| 7,073,808 B2 * | 7/2006 | Egan | 280/291 |
| 7,108,273 B2 * | 9/2006 | Hunwardsen | 280/291 |
| 7,175,200 B1 * | 2/2007 | Obershan | 280/756 |
| 7,278,560 B2 * | 10/2007 | Aron | 224/413 |
| 7,475,897 B2 * | 1/2009 | Wang | 280/291 |
| 7,721,836 B1 * | 5/2010 | Hodgen | 180/209 |
| 7,793,747 B2 * | 9/2010 | Brown | 180/219 |
| 7,850,187 B1 * | 12/2010 | Ford | 280/293 |
| 8,272,310 B2 * | 9/2012 | Ingram | 89/36.09 |
| 2003/0095688 A1 * | 5/2003 | Kirmuss | 382/105 |
| 2004/0046359 A1 * | 3/2004 | Welch et al. | 280/304.3 |
| 2004/0118626 A1 * | 6/2004 | Barnes | 180/219 |
| 2004/0123310 A1 * | 6/2004 | Ochiai et al. | 720/692 |
| 2005/0126546 A1 * | 6/2005 | Yagisawa | 123/509 |
| 2005/0178595 A1 * | 8/2005 | Lindby | 180/219 |
| 2006/0194604 A1 * | 8/2006 | Dieringer | 455/550.1 |
| 2006/0231308 A1 * | 10/2006 | Takahashi et al. | 180/89.1 |
| 2006/0285286 A1 * | 12/2006 | Littlejohn | 361/683 |
| 2006/0289215 A1 * | 12/2006 | Harper | 180/89.1 |
| 2007/0040665 A1 * | 2/2007 | Scott | 340/468 |
| 2007/0051026 A1 * | 3/2007 | Vor Keller | 42/70.11 |
| 2008/0007042 A1 * | 1/2008 | Yamasaki | 280/833 |
| 2008/0017432 A1 * | 1/2008 | Chelen | 180/219 |
| 2008/0174099 A1 * | 7/2008 | Brown | 280/854 |
| 2008/0237322 A1 * | 10/2008 | Mittelstaedt | 229/117.16 |
| 2010/0011904 A1 * | 1/2010 | Flanders | 74/551.1 |
| 2010/0012416 A1 * | 1/2010 | Chan et al. | 180/219 |
| 2010/0307852 A1 * | 12/2010 | Aramayo et al. | 180/219 |
| 2011/0100741 A1 * | 5/2011 | King et al. | 180/219 |

* cited by examiner

POLICE MOTORCYCLE KIT

CROSS REFERENCE TO RELATED APPLICATION

This application claims priority to U.S. Provisional Patent Application entitled "POLICE MOTORCYCLE KIT," Ser. No. 61/314,496, filed Mar. 16, 2010, the disclosure of which is hereby incorporated entirely herein by reference.

BACKGROUND OF THE INVENTION

1. Technical Field

This invention relates generally to motorcycle kits and more particularly to a kit for converting a motorcycle into a police motorcycle.

2. Description of the Related Art

Police officers are sworn to an oath to protect and to serve. As a result, in the line of duty these officers routinely place their lives in harm's way for the benefit of the general public. It is thus beneficial to the public at large if these officers are provided with the finest equipment to perform their jobs efficiently and effectively. However, the finest equipment must also meet the requisite safety standards, because the safety of our police officers is of utmost importance.

Police motorcycles have long been a part of the equipment at the disposal of the police force. Motorcycles allow motorcycle officers to move from location to location, as needed, and to apprehend vehicles and persons that may be breaking the law. Motorcycles provide an advantage over conventional police cruisers in that motorcycles are able to reach destinations and travel on surfaces that are otherwise unreachable by car.

However, many of today's powerful and technically advanced motorcycles are not equipped to perform as police motorcycles. Accordingly, there is a need to convert today's powerful, advanced motorcycles into motorcycles that meet the demands of the police force so that they can be used by the police force.

SUMMARY OF THE INVENTION

The present invention relates generally to motorcycle kits and more particularly to a kit for converting a motorcycle into a police motorcycle. For example, the motorcycle kit according to some embodiments may convert a Kawasaki Concours 14 Motorcycle, also known as the Kawasaki 1400GTR in markets outside the U.S., into a police motorcycle. In addition, the present invention can convert other motorcycles, such as, but not limited to, the Concours 14 ABS and the 1400GTR ABS, which come standard with ABS systems, into police motorcycles.

One aspect of the present invention may include a kit comprising a front-side drop bar that extends substantially perpendicularly from the frame of the motorcycle on both the right and left sides of the motorcycle. The front-side drop bar further includes an outer portion that is structured to run substantially parallel with the ground and touch the ground along substantially its entire surface from top to bottom under the condition that the motorcycle is tipped on its side. The outer portion is supported on its top end, its bottom end, and near its center.

Another aspect of the present invention may include the kit that comprises a rear drop bar that attaches to the frame of the motorcycle near the rear wheel and extends from one side of the motorcycle around the rear of the motorcycle to the opposite side of the motorcycle. The rear drop bar attaches to and extends from the frame at two positions on each side of the motorcycle. The two portions of the drop bar converge to a junction point, at which the rear drop bar becomes a single bar and extends around the rear of the motorcycle. The rear drop bar further comprises a back plate upon which rear reflectors are positioned.

Another aspect of the present invention may include the kit that comprises a front impact guard, wherein the front impact guard attaches to one side of the motorcycle near the axle of the front wheel and extends upward around and across the front portion of the front bumper and then downward toward the other side of the motorcycle where it reattaches to the frame near the axle of the front wheel.

Another aspect of the present invention may include the kit that comprises dual-opening rear saddlebags, each saddlebag structured to open in two configurations. The first configuration is a side-open configuration where one entire side of the saddlebag opens completely from the other side, exposing the entire inner contents of the saddlebag. The second configuration is a clamshell configuration where only a top portion of the one side is opened to partially expose the inner contents of the saddlebag.

Another aspect of the present invention may include the kit that comprises a controller compartment positioned near the rear of the motorcycle behind the passenger seat. The controller compartment may include a lid and a secondary lid. Lifting the lid exposes a storage compartment, wherein the bottom of the storage compartment comprises the secondary lid. Lifting the secondary lid exposes a controller compartment having additional storage, as well as a controller for controlling the operation of the police siren, police lights, and other audio and visual effects consistent with a police unit.

Another aspect of the present invention may include the kit that comprises risers positioned between the frame of the motorcycle and the handlebars of the motorcycle, the risers raising the handlebars of the motorcycle such that the rider is capable of sitting in an upright position rather than a more prone position. Moreover, the risers raise the handlebars of the motorcycle to provide the motorcycle with a more complete range of motion, in that the handlebars do not contact the rider or the frame of the motorcycle when the handlebars of the motorcycle are turned sharply to make a quick, agile turn.

Another aspect of the present invention may include the kit that comprises a siren mounted to the motorcycle. The kit may further comprise a holster to hold a radar gun, or speed gun, for monitoring the speed of vehicles in traffic.

Another aspect of the present invention may include the kit that comprises light flashers integrated into at least the headlight, the sides of the motorcycle, the side-view mirrors, the rear drop bar, and the controller compartment of the motorcycle.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

Figure 1:
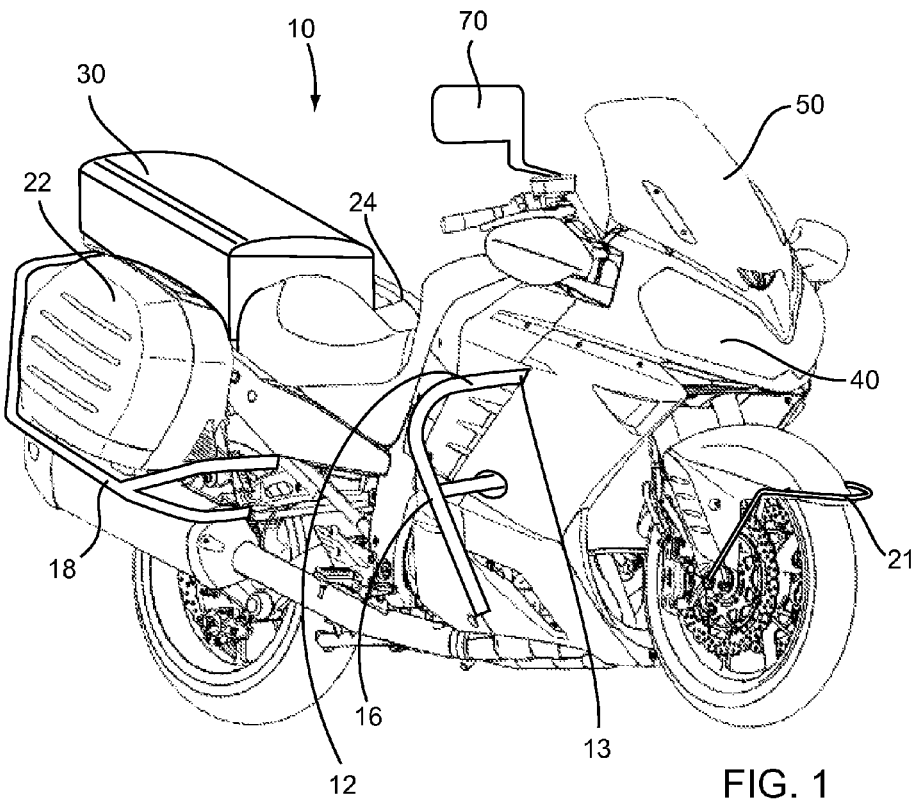
FIG. 1 is a side perspective view of the right side of the motorcycle in accordance with the present invention.

As discussed above, embodiments of the present invention relate generally to motorcycle kits and more particularly to a kit for converting a motorcycle into a police motorcycle. For example, the motorcycle kit according to some embodiments may convert a Kawasaki Concours 14 Motorcycle (also known as the Kawasaki 1400GTR, as mentioned above), into a police motorcycle.

Kawasaki's various models of its Concours 14 are powerful and technically advanced motorcycles. For example, it has been stated that Kawasaki's Concours 14 combines breathtaking engine performance and impeccable handling to create the most impressive long-distance, high-speed machine on the market today. Further, thanks to its sporting heritage, the Concours 14 is not only an awe-inspiring road burner, but it can also carve up mountain roads like a true supersport motorcycle. The Concours 14 may be a physically impressive machine, but as soon as riders flip the side stand up, they can feel the motorcycle's lightweight feel. When equipped with the confidence-enhancing ABS brake system, the Concours 14 features radial-mount front calipers operated by a radial-pump master cylinder, for the superb control and powerful, reliable braking performance that riders demanding high performance expect. Also, the Concours 14 can be equipped with a traction control system, KTRC, to enhance the handling of the motorcycle. The Concours 14's phenomenally responsive handling characteristics make the other motorcycles in its category seem like mere transports by comparison. Based on these performance features, Kawasaki's Concours 14 is a prime candidate for conversion to a top-flight police motorcycle.

As shown in FIGS. 1-4, the motorcycle 10 includes components of a kit for converting a motorcycle, such as, but not limited to, a Kawasaki's Concours 14 motorcycle into a police bike. The kit for the motorcycle 10 includes a right-side front drop bar 12, a left-side drop bar 14, a rear drop bar 18, and a front impact guard 21. The kit for the motorcycle 10 further includes right and left-side rear saddlebags, 22 and 24, respectively, and a controller compartment 30 positioned above and between the saddlebags 22 and 24. The kit for the motorcycle 10 also includes front headlights 40, a siren 46, a windshield 50, and front handlebar risers 60. The features of the kit mentioned above will be described in further detail below.

FIG. 1 shows the right-front drop bar 12. The right-front drop bar 12 couples to the frame of the motorcycle 10 at a portion of the frame between the front wheel of the motorcycle 10 and a rider. The right-front drop bar 12 connects to the frame of the motorcycle 10 in at least two locations, one of the locations being located higher above the other location on the frame of the motorcycle 10. The two locations form a vertical line that is substantially perpendicular to the ground along which the motorcycle 10 travels. Also, the right-front drop bar 12 extends outwardly from, and substantially perpendicular to, the frame of the motorcycle 10.

Figure 6:
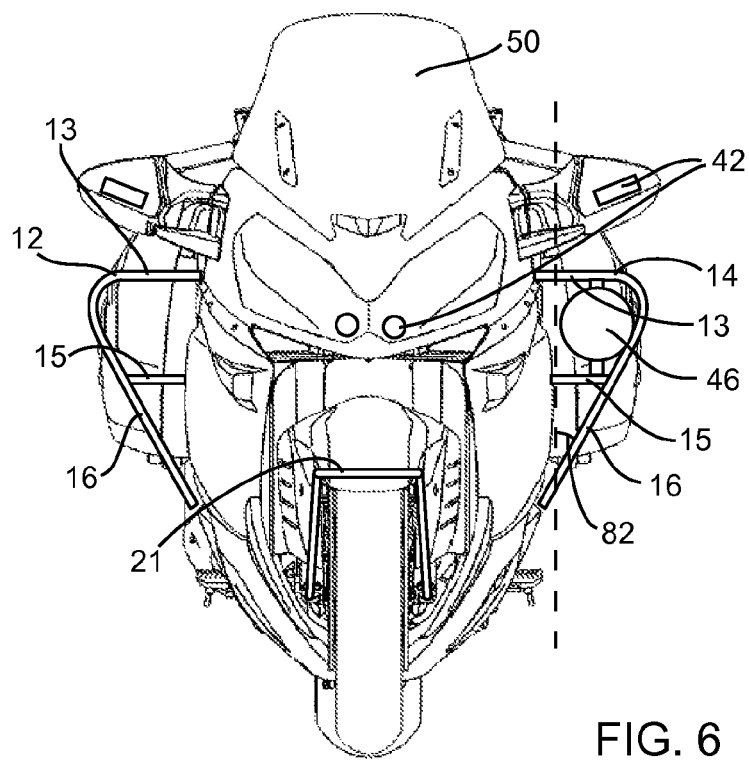
FIG. 6 is a front view of the motorcycle in accordance with the present invention.

As shown in FIG. 6, the right-front drop bar 12 comprises an outer section 16 and a middle section 15. The outer section 16 and the middle section 15 may be coupled together by welding, or any other permanent adhesion technique. A top portion 13 of the outer section 16 of the right-front drop bar 12 couples to the frame of the motorcycle 10 and extends perpendicularly outward from the frame of the motorcycle 10. At the outermost point of the top portion 13, the outer section 16 bends downward and angles substantially toward the frame of the motorcycle 10 and the ground surface upon which the motorcycle 10 travels. The outer section 16 continues until it reaches the middle section 15. The middle section 15 couples to the frame of the motorcycle 10 on one end and is attached to the inside of the outer section 16 on its other end. The middle section 15 extends perpendicularly outward from the frame of the motorcycle 10, but does not extend as far from the frame of the motorcycle 10 as does the outermost point of the top portion 13 of the outer section 16, described above. Once the outer section 16 meets the middle section 15, the outer section 16 continues to extend downward toward the frame of the motorcycle 10 and the ground surface upon which the motorcycle travels. The bottom portion of the outer section 16 that extends below the middle section 15 may couple with the frame of the motorcycle 10 at the bottom end of the outer section 16, or, in the alternative, the bottom portion of the outer section 16 may remain detached from the frame of the motorcycle 10. The configuration of the top portion 13, the outer section 16 and the middle section 15 allows the outer section 16 of the right-front drop bar 12 to be positioned at a predetermined angle from the vertical frame of the motorcycle 10.

The above-mentioned predetermined configuration provides at least the following advantages. For example, an angle 82 formed by the outer section 16 of the right-side drop bar 12 with respect to the frame of the motorcycle 10 allows the outer section 16 to absorb the impact that results when the motorcycle 10 tips over and falls to the ground. The resultant impact is absorbed by the outer section 16 because the above-described configuration provides that substantially the entire length of the outer section 16 contacts the ground surface at impact. Consequently, the resultant force of the impact is distributed substantially among the locations at which the right-front drop bar 12 connects to the frame. Because the impact is thus distributed, the likelihood that the frame is pierced by any of the portions of the right-front drop bar 12 that connects to the frame is minimized, if not eliminated, and the likelihood that the right-front drop bar 12 is disfigured upon impact is likewise minimized, if not eliminated.

Also, the predetermined angle 82 of the outer section 16 with respect to the vertical frame of the motorcycle 10 permits substantially the entire length of the outer section 16 to be positioned parallel with and contact the surface upon which the motorcycle 10 rests under the condition that the motorcycle 10 is placed on its side, or is tipped over. The predetermined angle 82 also prevents the motorcycle 10 from receiving scratches and/or dents under the condition that the motorcycle 10 is tipped over. The predetermined angle 82 is measured from the frame of the motorcycle 10, as mentioned above, and the frame of the motorcycle 10 can be represented by a vertical plumb line so that the predetermined angle 82 is accurately measured and set. It will be understood that in some embodiments, the predetermined angle 82 falls within a range of between 30 to 40 degrees. In other embodiments, the predetermined angle 82 is between a more limited range of 33 to 37 degrees. In yet other embodiments, the predetermined angle 82 is set at approximately 35 degrees.

The right-side front drop bar 12 is constructed of a material sufficient to withstand the impact of the motorcycle 10 hitting the ground surface. In certain embodiments the top portion 13, the middle section 15, and the outer section 16 of the right-side front drop bar 12 are formed of one, solid piece of tube-shaped steel that is bent into the predetermined configuration prior to attachment to the frame.

Figure 3:
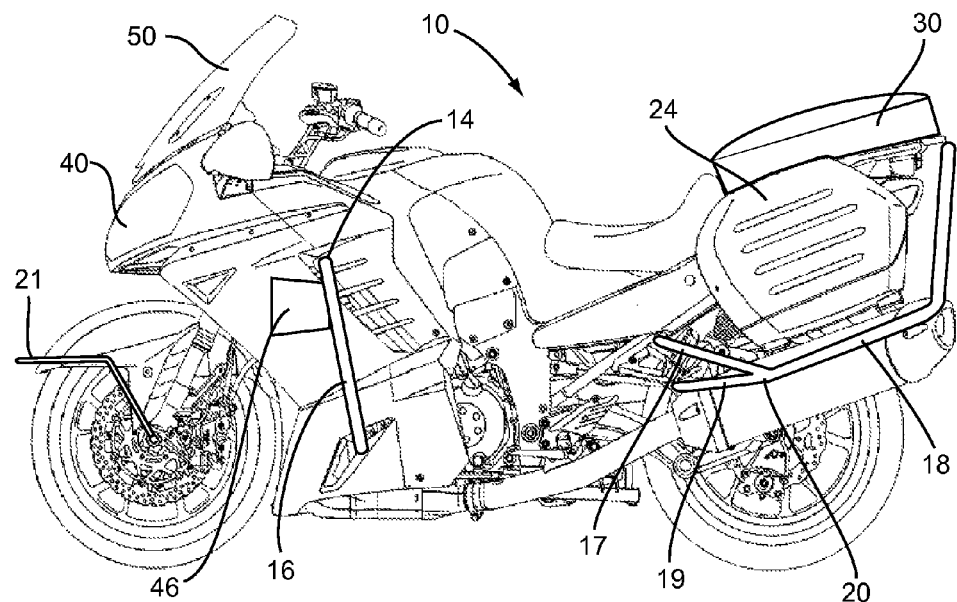
FIG. 3 is a side view of the left side of the motorcycle in accordance with the present invention.
Figure 4:
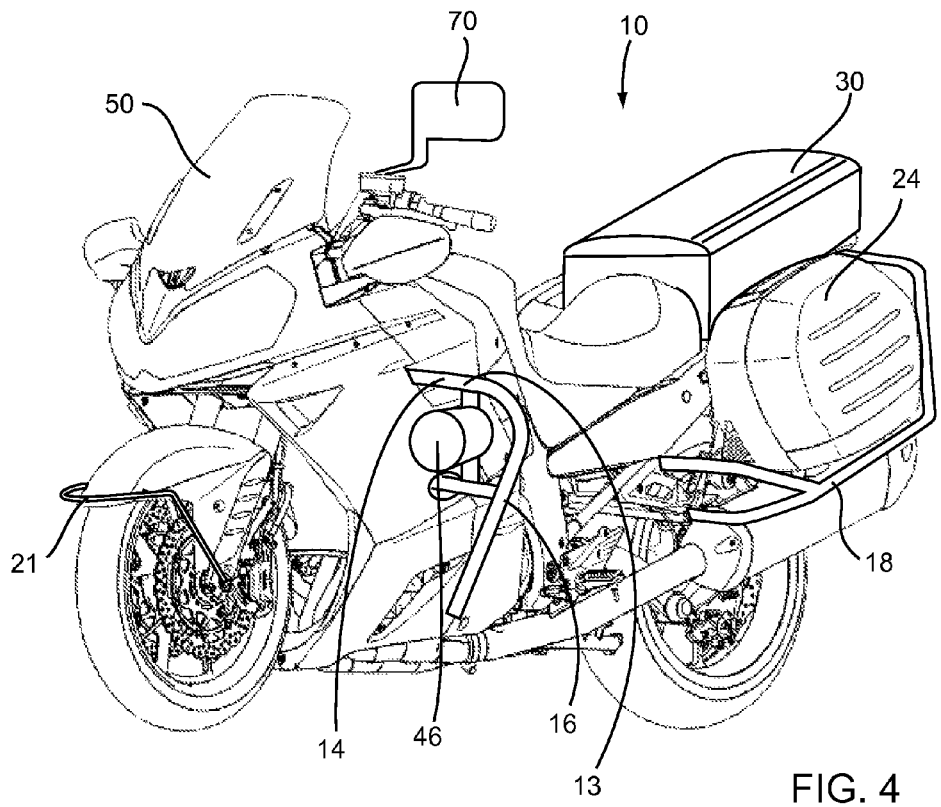
FIG. 4 is a side perspective view of the left side of the motorcycle in accordance with the present invention.

The left-side front drop bar 14, shown in FIGS. 3 and 4, is of the same orientation and angle as that described above with respect to the right-side front drop bar 12, except that the left-side front drop bar 14 is attached to the left-side of the motorcycle frame and the right-side front drop bar 12 is attached to the right-side. Therefore, a detailed explanation of the left-side front drop bar 14 specifically is not necessary.

Figure 2:
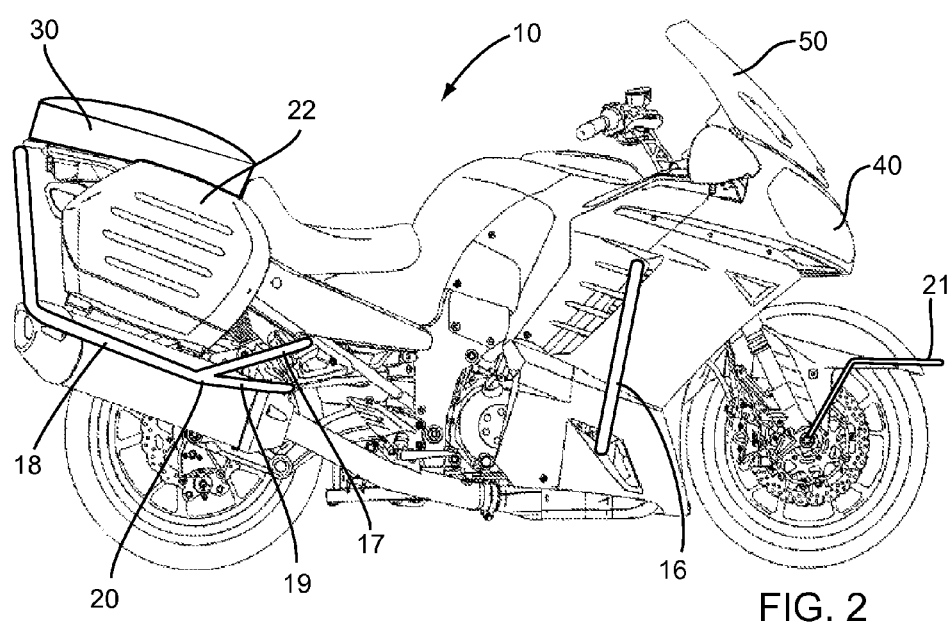
FIG. 2 is a side view of the right side of the motorcycle in accordance with the present invention.

FIGS. 1 and 2 show the configuration of the rear drop bar 18 on the right side of the motorcycle 10. FIG. 2 shows that the rear drop bar 18 connects to the right side of the motorcycle 10 at two distinct positions. An upper portion 17 connects to the frame at one position and a lower portion 19 connects to the frame at the second position. The upper portion 17 and the lower portion 19 extend initially outward, substantially perpendicular from the frame and then angle rearward and downward toward a bottom surface of a right-side saddlebag 22. At the bottom surface of the right-side saddlebag 22, the upper portion 17 and the lower portion 19 join together at junction 20. Junction 20 is thus reinforced. The advantages of this reinforced junction will be explained in further detail below.

From junction 20, the rear drop bar 18 extends upward and rearward under the right-side saddlebag 22 to the rear of the motorcycle 10. Upon reaching the rear of the motorcycle 10, the rear drop bar 18 extends upward, almost vertically, as shown in FIG. 2, and then substantially horizontal across the rear of the motorcycle 10 until the rear drop bar 18 reaches the left side of the motorcycle 10. As shown in FIGS. 3 and 4, the configuration of the rear drop bar 18 on the left-side of the motorcycle 10 is equivalent to the configuration of the rear drop bar 18 as described above for the right-side. Specifically, the rear drop bar 18 on the left-side of the motorcycle 10 includes junction 20 and upper and lower portions, 17 and 19, respectively. Accordingly, a more detailed explanation of the rear drop bar 18 on the left-side of the motorcycle 10 is not necessary.

FIGS. 1 and 4 show that junction 20 on both the right and left-sides of the motorcycle 10 is the point on the rear drop bar 18 that extends the farthest outward from the sides of the motorcycle 10. Consequently, under the condition that the motorcycle 10 is dropped, or tipped, on its side, junction 20 is the portion of the rear drop bar 18 that comes in contact with the ground surface. Because junction 20 is reinforced with upper portion 17 and lower portion 19, the impact force of the fall is distributed between the upper portion 17 and the lower portion 19, such that neither portion alone absorbs the entire impact. As a result, the likelihood that the motorcycle frame is pierced by any of the portions of the rear drop bar 18 that connect to the frame is minimized, if not eliminated. Moreover, as shown in FIGS. 2 and 3, junction 20 on the right-side and junction 20 on the left-side of the motorcycle frame 10 are positioned below the right-side saddlebag 22 and the left-side saddlebag 24, respectively, so that in the event of a fall neither the right-side saddlebag 22 nor left-side saddlebag 24 touches the ground. Thus, although the junction 20 does not extend away from the frame of the motorcycle 10 as far as the outer surfaces of either of the right-side saddlebag 22 or the left-side saddlebag 24, the pre-calculated position of the junction 20 under the saddlebags, 22 and 24, nevertheless prevents impact from the fall.

The rear drop bar 18 is constructed of a material sufficient to withstand the impact of the motorcycle 10 hitting the ground surface. In certain embodiments the lower portion 19 on each side of the motorcycle 10 and the portion of the rear drop bar 18 that extends around and behind the motorcycle 10 is formed of one, solid piece of tube-shaped steel that is bent into the predetermined configuration prior to attachment to the frame. Further, the upper portion 17 that runs from the frame of the motorcycle 10 to the junction 20 on either side of the motorcycle 10 is also made of tube-shaped steel and is welded to the rear drop bar 18 prior to attachment to the frame.

Figure 5:
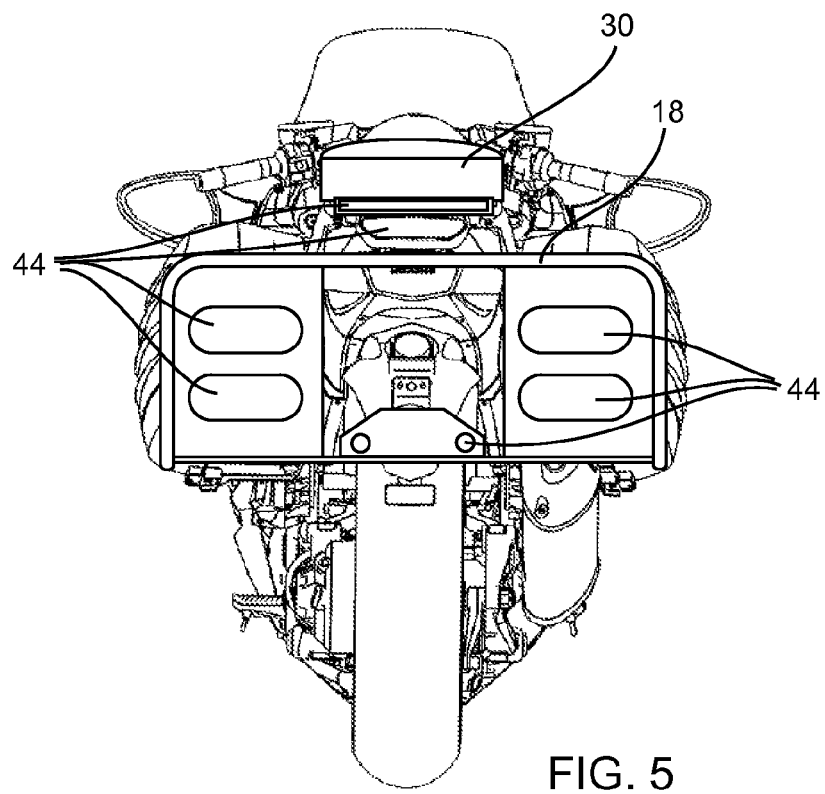
FIG. 5 is a rear view of the motorcycle in accordance with the present invention.

FIG. 5 shows the rear of the motorcycle 10, including the drop bar 18 that runs substantially horizontal across the rear of the motorcycle 10. Various rear lights 44 such as flashers are positioned on components of the motorcycle 10, including plates attached to the drop bar 18 and a controller compartment 30, to be discussed in detail below.

FIG. 6 shows the front of the motorcycle 10, including front headlights 40 in accordance with the invention. The front headlights 40 operate according to conventional headlights. However, part of the kit of the motorcycle 10 includes front flashers 42 that are integrated into the front headlights 40 and into the side-view mirrors. The front flashers 42 integrated into the front headlights 40 are positioned within the housing that houses the front headlights 40, but do not alter the normal operation of the front headlights 40. Indeed, the front flashers 42 may work in tandem with the front headlights 40. The front flashers 42 that are integrated into the side-view mirrors are positioned on the outer casing of each of the left and right side-view mirrors facing away from the rider so that front flashers 42 are visible to vehicle traffic and pedestrians. The front flashers 42 that are integrated into the side-view mirrors also do not alter the normal operation of the mirror portion of the side-view mirrors that faces the rider.

FIG. 6 further shows a windshield 50 in accordance with the invention. The windshield 50 protects the rider from the air turbulence created by the velocity of the motorcycle traveling upon a ground surface. The windshield 50 is structured to transition between a fully upright position and a fully refracted position. In the fully retracted position, the windshield 50 rests lower on the front of the motorcycle 10 than the windshield 50 in the fully upright position. The windshield 50 may be transitioned between the fully upright position and the fully retracted position by several methods. The windshield 50 may automatically transition between the fully retracted position and the fully upright position upon ignition of the motorcycle 10. On the same note, when the motorcycle 10 is turned off, the windshield 50 automatically returns to the fully retracted position. The windshield 50 may also be transitioned between the fully retracted position and the fully upright position by the rider operating a switch. Further, the windshield 50 may transition between a fully retracted position and a fully upright position based upon the velocity of the motorcycle. As the motorcycle 10 increases in velocity, the windshield 50 reaches the fully upright position. As the motorcycle 10 comes to rest, the windshield 50 reaches the fully retracted position.

As shown in FIGS. 4 and 6, the front of the motorcycle 10 includes a front impact bar 21, in accordance with the invention. The front impact bar 21 attaches to the motorcycle 10 on each side of the front axle of the front wheel. The front impact bar 21 extends upward and forward from each of the axles toward the front of the motorcycle 10. At the point the front impact bar 21 reaches the front bumper, the front impact bar 21 extends substantially horizontal toward the front of the motorcycle 10. The front impact bar 21 then wraps around the front of the front bumper of the motorcycle 10 to protect the motorcycle 10 from frontal impact. The front impact bar 21 is constructed of a material sufficient to protect the motorcycle 10 from minor impacts, such as brushing a wall or another vehicle. In certain embodiments the front impact bar 21 is formed of one, solid piece of tube-shaped steel that is bent into the predetermined configuration prior to attachment to the frame.

FIG. 6 provides a greater understanding of the predetermined angle of the outer section 16 of each of the right-side front drop bar 12 and the left-side front drop bar 14 with respect to the vertical plane of the motorcycle 10. As mentioned above, the predetermined angle between the vertical plane of the motorcycle 10 and the outer section 16 of each of the drop bars, 12 and 14, allows substantially the entire surface of the outer section 16 to contact the ground surface and distribute the impact of the ground surface should the motorcycle be tipped over on either of its sides. Moreover, the rear drop bar 18, explained in detail above, assists the outer section 16 in distributing the impact of a fall. Indeed, if the motorcycle 10 should be tipped on its side, both the outer section 16 and the rear drop bar 18 are structured to contact the ground surface and prevent any portion of the frame of the motorcycle 10 from being damaged from contact with the ground surface.

FIGS. 3, 4 and 6 show the siren 46 in accordance with the invention. The siren 46 is attached to the left-side front drop bar 14 so as to face forward. Such orientation of the siren 46 provides acoustic benefits because by facing forward the sound from the siren 46 is more powerful in the direction of travel of the motorcycle 10, which allows the rider to warn or clear-out upcoming or oncoming traffic or pedestrians, if needed. Moreover, placement of the siren 46 on the drop bar 14 prevents the siren 46 from receiving damage should the motorcycle 10 be tipped on its side. However, one of ordinary skill in the art will understand that the siren 46 may also be secured to any other surface of the motorcycle 10 where the siren 46 may function properly and be protected from damage in a fall.

Figure 7:
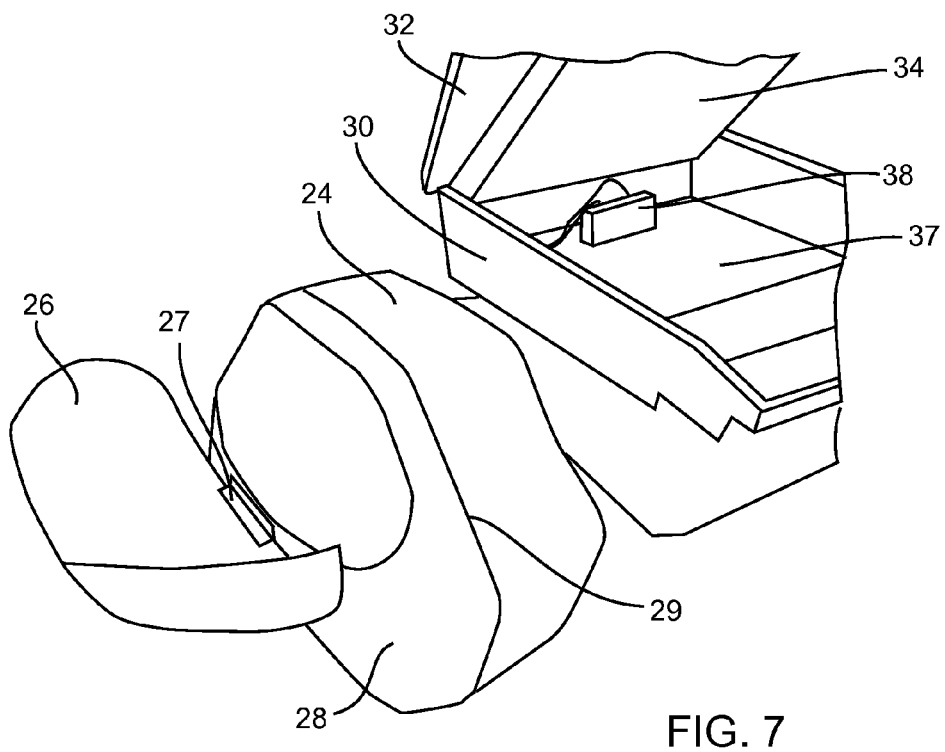
FIG. 7 is a perspective view of the left rear side of the motorcycle in accordance with the present invention.
Figure 8:
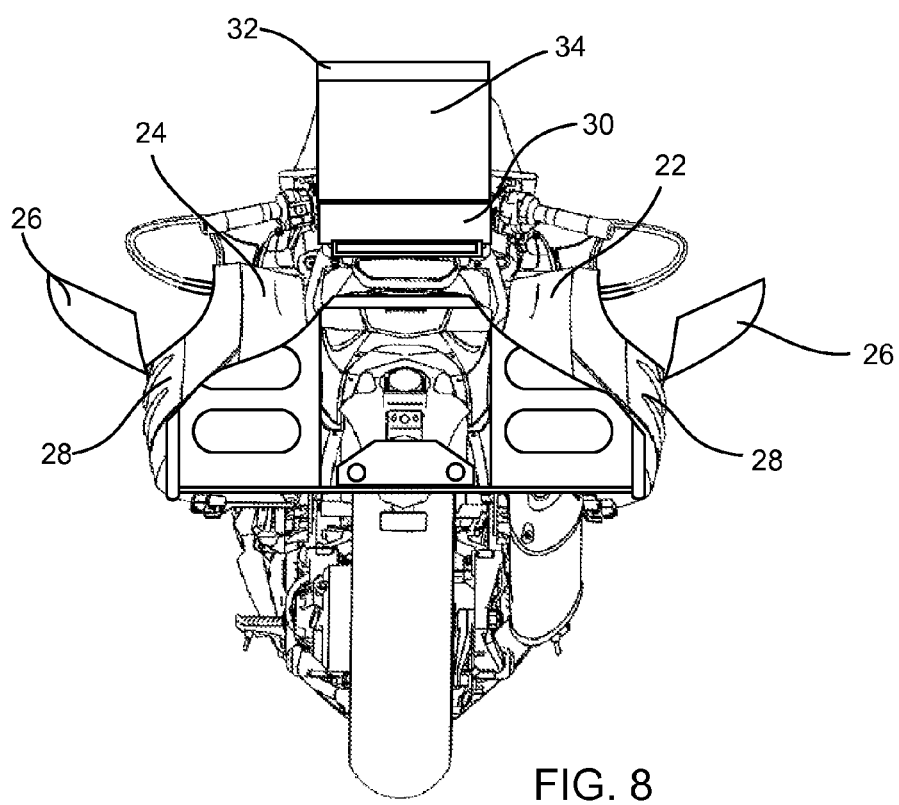
FIG. 8 is a rear perspective view of the motorcycle in accordance with the present invention.
Figure 10:
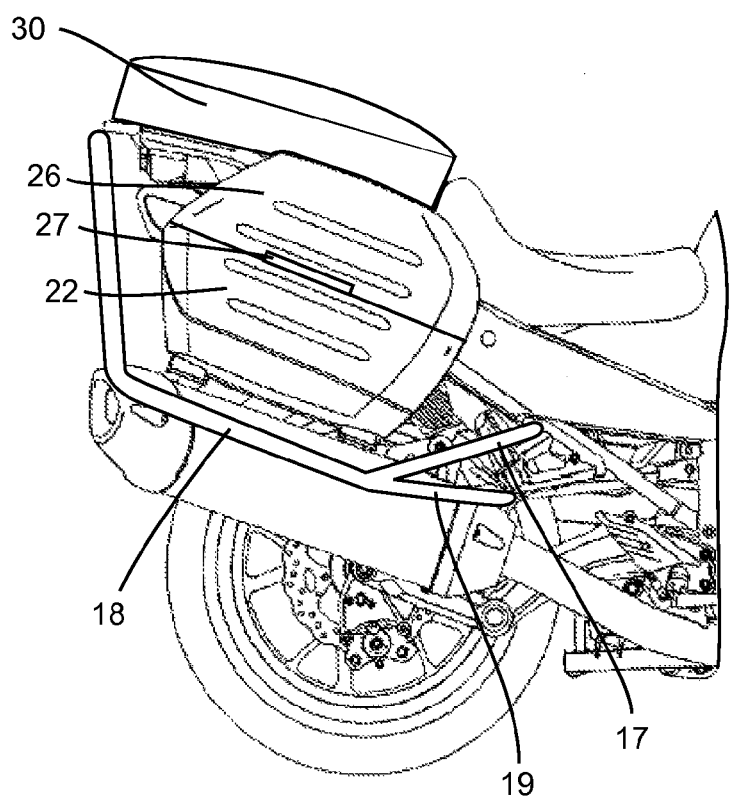
FIG. 10 is a side view of the right rear side of the motorcycle in accordance with the present invention.

FIGS. 7, 8 and 10 show the structure and operation of the right and left-side saddlebags, 22 and 24, respectively, in accordance with the invention. FIG. 7 shows the left-side saddlebag 24, however the left-side saddlebag 24 is structured to operate in the same manner as the right-side saddlebag 22. Thus, an explanation of the right-side saddlebag 22 in addition to the left-side saddlebag 24 is not necessary. The left-side saddlebag 24 includes an outer side 28, a clamshell lid 26, a clamshell hinge 27, and an outer-side opening crease 29. The outer side 28 includes the clamshell hinge 27 and the clamshell lid 26. The outer-side opening crease 29 defines the outer side 28 from the remaining portion of the left-side saddlebag 24.

The left-side saddlebag 24 can be opened in two different configurations, in a side-opening position or a clamshell-opening position. To place the saddlebag 24 in the side-opening position (not shown), a latch is operated that releases the upper portion of the entire outer side 28 from the saddlebag 24 along the outer-side opening crease 29, such that the upper portion of the outer side 28 pivots away from the saddlebag 24 about a hinge located on the bottom of the saddlebag 24. Thus, the entire side of the saddlebag 24 is open to expose the inner contents of the saddlebag 24. To place the saddlebag 24 in the clamshell-opening position, as shown in FIGS. 7 and 8, a latch is operated that releases the top portion of the clamshell lid 26 from the outer side 28. Once released, the clamshell lid 26 may be pivoted about the clamshell hinge 27 away from the outer side 28 to expose the contents of the saddlebag 24. Once opened, the clamshell lid may rest in a substantially horizontal position by way of a securing mechanism that prevents the clamshell lid 26 from pivoting further away from the outer side 28.

FIG. 10 shows the saddlebag 26 in the closed position in accordance with the invention. The latch that releases the clamshell lid 26 can be seen on the top portion of the outer side 28 and the clamshell hinge 27 is approximately halfway down the side of the outer side 28. As shown in FIGS. 7 and 8, the saddlebag 24 may be opened in the clamshell-opening position without opening the saddlebag 24 in the side-opening position. Also, the saddlebag 24 may be opened in the side-opening position without opening the saddlebag 24 in the clamshell-opening position.

Figure 9:
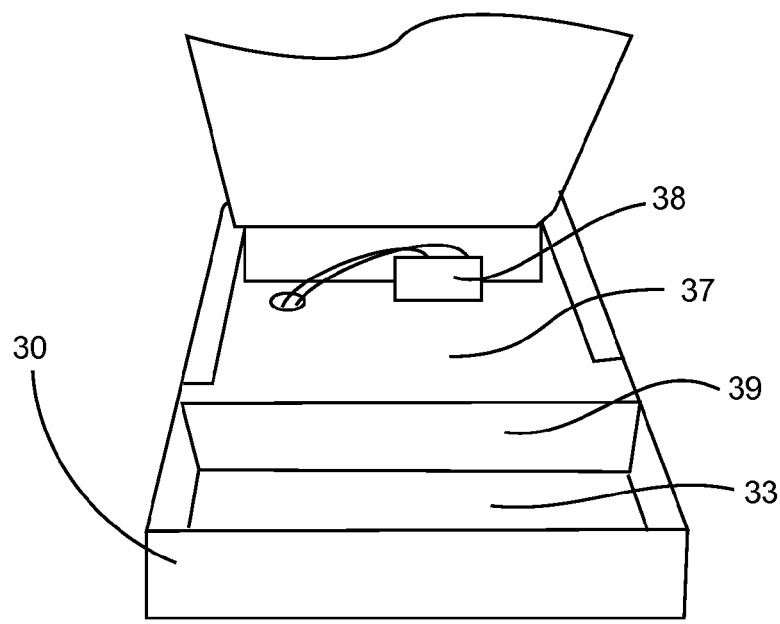
FIG. 9 is a rear perspective view of controller compartment of the motorcycle in accordance with the present invention.

FIGS. 7-9 show the controller compartment 30 in accordance with the invention. The controller compartment 30 houses the controller 38, as shown in FIG. 7. The controller compartment 30 has a first lid 32 and a second lid 34 underneath the first lid 32, as shown in FIG. 8. The first lid 32 comprises the outer shell of the controller compartment 30. Opening the first lid 32 exposes an upper storage compartment for storing objects. The second lid 34 comprises the bottom portion of the upper storage compartment. The second lid 34 may be opened to expose the controller 38 within a controller storage compartment 37, as shown in FIGS. 7 and 9. A partition wall 39 may be formed within the controller storage compartment 37 to separate the controller storage compartment 37 from a secondary storage compartment 33. The secondary storage compartment 33 may be used to store or house any number of components or user items, as the user deems appropriate.

As shown in FIG. 9, the controller 38 is structured to operate the various components of the motorcycle kit. The controller 38 controls the audio and visual effects of the siren 46 and the flashers 42 and 44. The controller can also control the movement of the windshield 50. Placing the controller 38 under the second lid 34 not only hides the controller 38 from view and protects it from any objects placed in the upper storage compartment above the controller 38, but it also places the controller 38 within easy reach for repair and maintenance.

Figure 11:
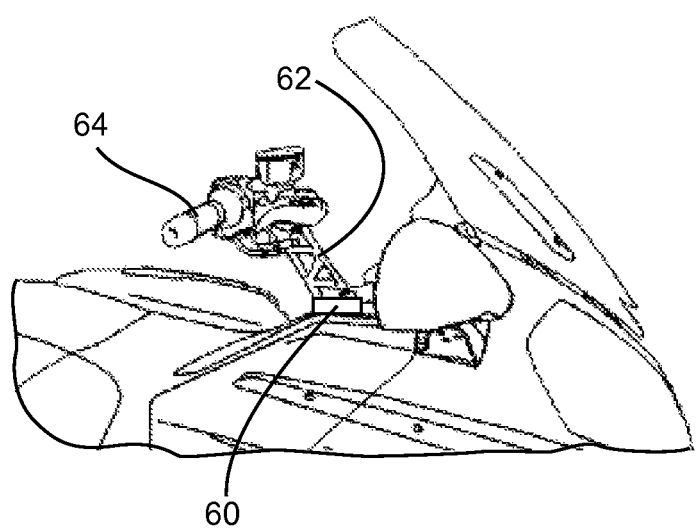
FIG. 11 is a right-side perspective view of the steering mechanism of the motorcycle in accordance with the present invention.
Figure 12:
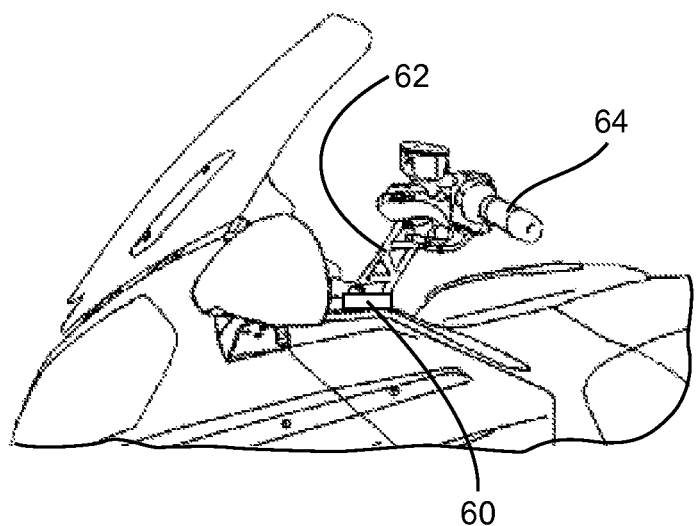
FIG. 12 is a left-side perspective view of the steering mechanism of the motorcycle in accordance with the present invention.
Figure 13:
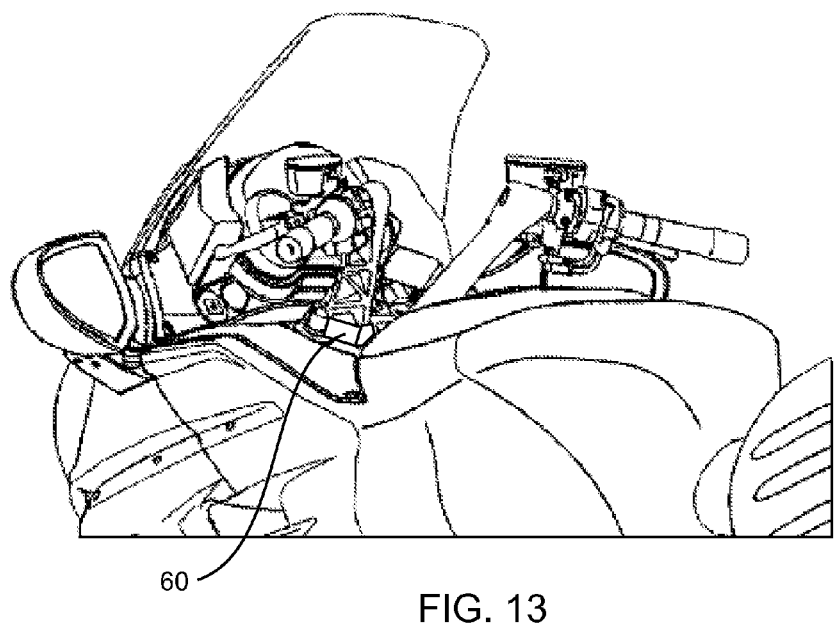
FIG. 13 is a perspective view of the steering mechanism of the motorcycle in accordance with the present invention.

As shown in FIGS. 11-13, the police motorcycle kit also comprises handlebar risers 60 in accordance with the invention. As shown in FIG. 11, handlebar stems 62 extend from the handlebar risers 60 and attach to the handlebar assembly 64. The handlebar stems 62 may be bolted to the handlebar risers 60. FIG. 11 shows the handlebar riser 60 on the right-side handlebar assembly 64, whereas FIG. 12 shows the handlebar riser 60 on the left-side handlebar assembly 64. The handlebar risers 60 provide an advantage for the police motorcycle 10. As shown in FIG. 13, the handlebar risers 60 raise the handlebar assembly 64 upward from the motorcycle frame. Raising the handlebar assembly 64 gives the rider a fuller range-of-motion to turn the handlebars to make quicker, more agile turns without having the handlebars contact either the rider, such as the rider's legs, or the frame of the motorcycle itself. Moreover, by raising the handlebars with the handlebar risers 60, the rider is able to sit on the motorcycle 10 and reach the handlebars in an upright position, instead of a prone position. An upright position makes it feasible for the rider to operate the motorcycle 10 while being able to more easily observe the surroundings, which is invaluable to a police officer on duty.

The handlebar risers 60 can be made of any material sufficiently strong to maintain the structural integrity of the handlebar assembly 64 and allow the steering mechanism to function as described above.

Figure 14:
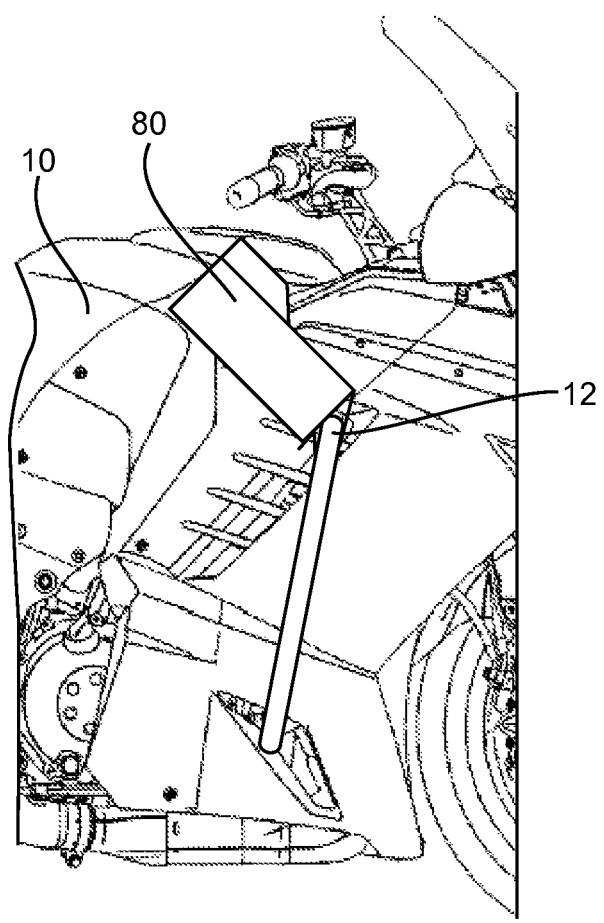
FIG. 14 is a side view of a motorcycle with a holster coupled to a front drop bar.

Referring to FIG. 14, the motorcycle kit also may comprise a holster 80 coupled to a front drop bar 12 to hold a radar gun or speed. The holster 80 may be position so as to not interfere with the operation of the handlebars of the motorcycle 10 and further does not inhibit the drop bars 12 from performing its intended function of preventing damage to the motorcycle 10 in response to a drop of the motorcycle 10.

As shown in FIG. 1, the kit according to the present invention also includes extended side view mirrors 70 that are coupled to one end of an extension, wherein the other end of the extension is coupled to the handlebar assembly 64. The extension is structured to allow the mirrors 70 to extend further from the frame of the motorcycle in both the horizontal and vertical directions than the original side-view mirrors of the motorcycle 10 such as the Concours 14. With the mirrors 70 in the extended position, the rider can remain seated in an upright position during operation of the motorcycle 10 and use the mirrors 70 to view traffic to the side and rear of the motorcycle.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. For example, any model numbers or specific motorcycle descriptions, listed above, are used for illustrative purposes only and are not considered to limit the present invention. Also, it is contemplated that the present invention is applicable to other motorcycle makes and models. Accordingly, many modifications and variations are possible in light of the teachings above without departing from the spirit and scope of the invention.

The invention claimed is:

1. A motorcycle kit comprising:
two front drop bars that extend substantially perpendicularly from a frame of a motorcycle, wherein one extends from a right side and the other from a left side of the motorcycle, each front drop bar extending further from the frame than a handlebar on the same side of the motorcycle, wherein each front drop bar further comprises:
an outer portion that is structured to run substantially parallel with the ground and contact the ground along substantially the entire surface of the outer portion from top to bottom under the condition that the motorcycle is tipped on its side, wherein the outer portion is coupled to the frame of the motorcycle in at least two locations, one of the locations being located higher above the other location on the frame of the motorcycle, wherein a highest portion of the of the outer portion is coupled to the frame, a middle portion of the outer portion is coupled to a frame, and a lowest portion of the outer portion of each front drop bar is unsupported, and wherein the outer portion extends downward from the highest portion and angles toward the motorcycle until the lowest portion; and
a rear drop bar attached to the frame of the motorcycle near the rear wheel and extending from one side of the motorcycle around the rear of the motorcycle to the opposite side of the motorcycle, wherein the rear drop bar comprises an upper portion and a lower portion attached to and extending from the frame at two positions on each side of the motorcycle, the upper portion and lower portion joining together at a reinforced junction and the rear drop bar further comprises a back plate upon which rear lights are positioned.

2. The kit of claim 1, wherein the rear drop bar is formed of two portions attached to the frame of the motorcycle near the wheel on opposing sides of the motorcycle, the two portions of the drop bar converging to a junction point, at which the rear drop bar becomes a single bar and extends around the rear of the motorcycle.

3. The kit of claim 1, further comprising a front impact guard, wherein the front impact guard comprises a single bar that attaches on one side of the motorcycle to an axle of a front wheel and extends forward from the axle of the front wheel around and across a front portion of a front bumper and then rearward toward the other side of the motorcycle where it reattaches to the axle of the front wheel.

4. The kit of claim 1, further comprising dual-opening rear saddlebags, each saddlebag structured to open in two configurations.

5. The kit of claim 4, wherein a first configuration of the saddlebag is a side-open configuration where one entire side of the saddlebag opens completely from the other side, exposing the entire inner contents of the saddlebag.

6. The kit of claim 5, wherein a second configuration of the saddlebag is a clamshell configuration where only a top portion of the one side is opened to partially expose the inner contents of the saddlebag.

7. The kit of claim 1, further comprising risers positioned between the frame of the motorcycle and handlebars of the motorcycle, the risers raising the handlebars of the motorcycle such that the rider is capable of sitting in an upright position.

8. The kit of claim 7, wherein the risers raise the handlebars of the motorcycle, wherein the handlebars do not contact the motorcycle when the handlebars of the motorcycle are turned sharply to make a quick, agile turn.

9. A motorcycle kit for converting a motorcycle to a police motorcycle, the kit comprising:
two front drop bars that extend substantially perpendicularly from a frame of a motorcycle, wherein one extends from a right side and the other from a left side of the motorcycle, each front drop bar extending further from the frame than a handlebar on the same side of the motorcycle, wherein each front drop bar further comprises:
an outer portion that is structured to run substantially parallel with the ground and contact the ground along substantially the entire surface of the outer portion from top to bottom under the condition that the motorcycle is tipped on its side;
a top portion coupled to the outer portion; and
a middle section coupled to the outer portion, wherein the top portion and middle section are coupled to the frame of the motorcycle with the top portion coupled to the frame at a location higher than a location the middle section is coupled to the frame, wherein a highest portion of the of the outer portion is coupled to the frame, a middle portion of the outer portion is coupled to a frame, and a lowest portion of the outer portion of each front drop bar is unsupported, and wherein the outer portion extends downward from the highest portion and angles toward the motorcycle until the lowest portion;

a rear drop bar attached to the frame of the motorcycle near the rear wheel and extending from one side of the motorcycle around the rear of the motorcycle to the opposite side of the motorcycle, wherein the rear drop bar comprises an upper portion and a lower portion attached to and extending from the frame at two positions on each side of the motorcycle, wherein on each side of the motorcycle, the upper portion and lower portion join together at a reinforced junction with a bar that extends upward and rearward from the reinforced junction to the rear of the motorcycle, then extends upward and then substantially horizontal across the rear of the motorcycle and the rear drop bar further comprises a back plate upon which rear lights are positioned; and a front impact guard, wherein the front impact guard comprises a single bar that attaches on one side of the motorcycle to an axle of a front wheel and extends forward from the axle of the front wheel around and across a front portion of a front bumper and then rearward toward the other side of the motorcycle where it reattaches to the axle of the front wheel.

10. The kit of claim 9, wherein the rear drop bar is formed of two portions attached to the frame of the motorcycle near the wheel on opposing sides of the motorcycle, the two portions of the drop bar converging to a junction point, at which the rear drop bar becomes a single bar and extends around the rear of the motorcycle.

11. The kit of claim 9, further comprising dual-opening rear saddlebags, each saddlebag structured to open in a side-opening position or a clamshell-opening position.

12. The kit of claim 11, wherein comprises an outer side, wherein in the side-opening position comprises the entire outer side of the saddlebag opened completely from the saddlebag, exposing the entire inner contents of the saddlebag.

13. The kit of claim 12, wherein the outer side of the saddlebag comprises a clamshell lid, wherein the clamshell-opening position comprises the clamshell lid opened from the outer side to partially expose the inner contents of the saddlebag.

14. The kit of claim 9, further comprising a police siren coupled to a front drop bar between the outer portion and the frame of the motorcycle, wherein the front drop bar protects the siren from damage.

15. The kit of claim 14, further comprising a holster coupled to a top portion of the front drop bar to hold a radar gun or speed, wherein the holster extends upward and rearward from the top portion of the front drop bar.

16. The kit of claim 15, further comprising police light flashers integrated into at least one of the headlight, the sides of the motorcycle, the side-view mirrors, the rear drop bar, the controller compartment of the motorcycle, and combinations thereof.

17. The kit of claim 16, further comprising a controller compartment positioned near the rear of the motorcycle behind a passenger seat, wherein the controller compartment comprises a lid and a secondary lid.

18. The kit of claim 17, wherein lifting the lid exposes a storage compartment, wherein the bottom of the storage compartment comprises the secondary lid.

19. The kit of claim 18, wherein lifting the secondary lid exposes a controller compartment having additional storage and a controller for controlling the operation of the police siren, and the police light flashers.

20. The kit of claim 9, further comprising risers positioned between the frame of the motorcycle and handlebars of the motorcycle, the risers raising the handlebars of the motorcycle such that the rider is capable of sitting in an upright position.

21. The kit of claim 20, wherein the risers raise the handlebars of the motorcycle, wherein the handlebars do not contact the motorcycle when the handlebars of the motorcycle are turned sharply to make a quick, agile turn.

* * * * *